J. Y. SITTON.
Felly-Plate.

No. 163,698.

Patented May 25, 1875.

WITNESSES:
Frances McArdle
Alex F. Roberts

INVENTOR:
J. Y. Sitton
BY Munn & Co
ATTORNEYS.

THE GRAPHIC CO. PHOTO-LITH. 39 & 41 PARK PLACE, N.Y.

UNITED STATES PATENT OFFICE.

JAMES Y. SITTON, OF DUE WEST, SOUTH CAROLINA.

IMPROVEMENT IN FELLY-PLATES.

Specification forming part of Letters Patent No. 163,698, dated May 25, 1875; application filed April 3, 1875.

*To all whom it may concern:*

Be it known that I, JAMES Y. SITTON, of Due West, Abbeville county, South Carolina, have invented a new and Improved Wheel-Clip, of which the following is a specification:

My invention relates to an improvement upon the felly-clip shown and described in Letters Patent No. 70,438; and consists in providing the clip with vertical parallel side flanges or ears for embracing the sides of the tire, and holding it securely in place on the wheel, as hereinafter described.

Figure 1:
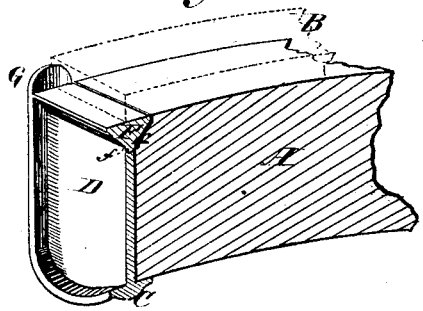
Figure 2:
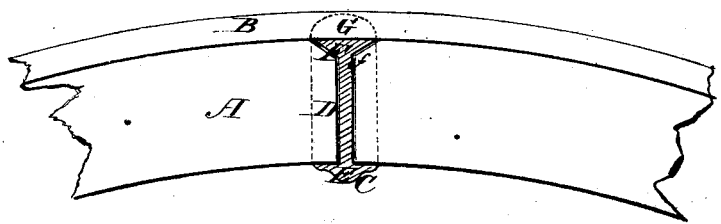
Figure 3:
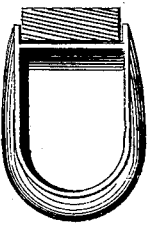

Figure 1 is a perspective sectional view of the felly tire and clip, and Fig. 2 a longitudinal section of the same. Fig. 3 is a cross-section through the clip.

The clip C is recessed on each side of the plate D to form sockets for the ends of the fellies A, whose joint is covered by the raised or flanged portion E. The wedge-shaped top F of the clip fits in a corresponding notch, $f$, between the fellies A A, and flush with their curved outer side, which is the periphery of the wheel.

The feature of my invention is the vertical ears or flanges G, formed on the sides of the clip, and extending up to embrace the sides of the tire B, thus holding the same in proper position on the felly.

It will be seen that this construction adapts the clip to be applied to wheels whose tires are secured by the ordinary means (screws or screw-bolts) without reconstruction of, or any change whatever in, the form of the tire—an advantage obviously important.

What I claim is—

The clip C, provided with the vertical parallel side ears or flanges G G, as and for the purpose specified.

JAMES Y. SITTON.

Witnesses:
JOHN H. ALLEN,
H. M. JOHNSON.